(12) United States Patent
Sharma et al.

(10) Patent No.: US 12,269,134 B1
(45) Date of Patent: Apr. 8, 2025

(54) POSITIONING A WORK PIECE

(71) Applicant: OMMO Technologies, Inc., Carrollton, TX (US)

(72) Inventors: Om Anand Binodkumar Sharma, Irving, TX (US); Jonah William Kirby, Carrollton, TX (US)

(73) Assignee: OMMO Technologies, Inc., Carrollton, TX (US)

( * ) Notice: Subject to any disclaimer, the term of this patent is extended or adjusted under 35 U.S.C. 154(b) by 85 days.

(21) Appl. No.: 17/727,267

(22) Filed: Apr. 22, 2022

(51) Int. Cl.
| | |
|---|---|
| *B23Q 1/25* | (2006.01) |
| *B23Q 3/02* | (2006.01) |
| *B23Q 3/10* | (2006.01) |
| *B25B 5/00* | (2006.01) |
| *B25H 1/08* | (2006.01) |
| *A63H 33/08* | (2006.01) |

(52) U.S. Cl.
CPC ............ *B23Q 1/25* (2013.01); *B23Q 3/02* (2013.01); *B23Q 3/102* (2013.01); *A63H 33/086* (2013.01); *B25B 5/006* (2013.01); *B25H 1/08* (2013.01)

(58) Field of Classification Search
CPC .... A63H 33/08; A63H 33/086; A63H 33/084; A63H 33/088; B23Q 3/102; B25H 1/08; B25B 5/006
See application file for complete search history.

(56) References Cited

U.S. PATENT DOCUMENTS 5,795,210 A * 8/1998 Kushner ............ A63H 33/086
446/124

FOREIGN PATENT DOCUMENTS

| DE | 202013001557 | 5/2013 |
| EP | 3305387 | 3/2020 |
| KR | 101710801 | 2/2017 |
| WO | 2020144484 | 7/2020 |

* cited by examiner

Primary Examiner — Tyrone V Hall, Jr.
(74) Attorney, Agent, or Firm — Henry Patent Law Firm PLLC

(57) ABSTRACT

In a general aspect, a system for selectively positioning a work piece includes multiple bodies. A first body includes a first exterior surface and a boss extending from the first exterior surface along a boss axis. The boss includes a boss end surface that terminates the boss. Boss perimeter surfaces define a perimeter of the boss and extend between the first exterior surface and the boss end surface. A second body includes a second exterior surface and a pocket extending from the second exterior surface into the second body along a pocket axis. The pocket is shaped to receive the boss in a discrete number of positions when the boss axis and the pocket axis are aligned. Pocket perimeter surfaces define a perimeter of the pocket and extend into the second body from the second exterior surface.

20 Claims, 9 Drawing Sheets

POSITIONING A WORK PIECE

BACKGROUND

The following description relates to positioning a work piece.

Fixtures and jigs are often used to secure a work piece to a support surface and hold the work piece in a desired position. The fixtures and jigs may include devices—such as screws, clamps, vises, and so forth—to apply holding forces to the work piece that resist its motion to other forces. Achieving the desired position may involve a time-consuming process of iteratively displacing the work piece until its positional tolerance is below an acceptable limit.

DETAILED DESCRIPTION

Figure 1A:
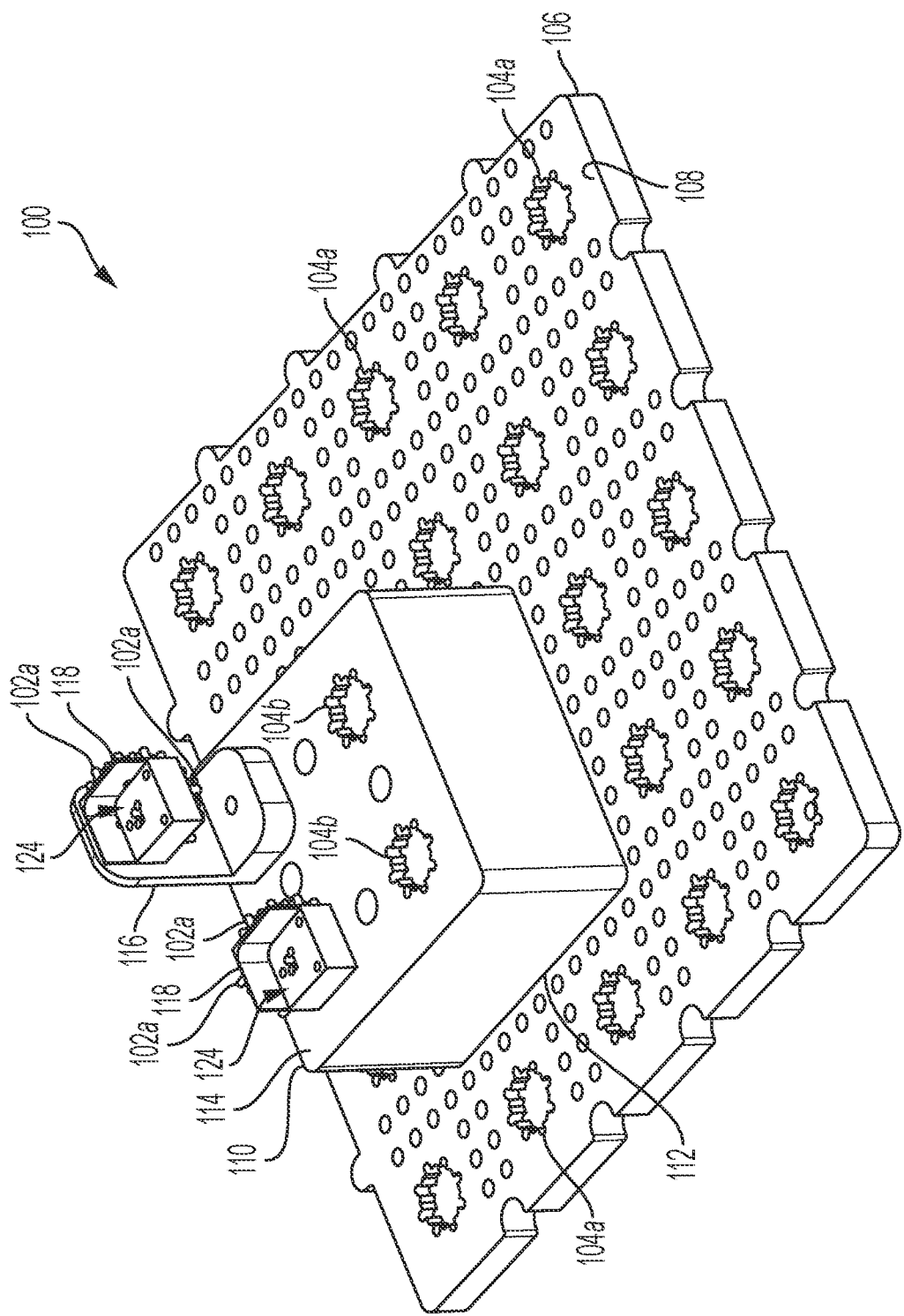
FIG. 1A is a schematic diagram, shown in perspective view, of an example system for selectively positioning a work piece.

In a general aspect, a system for selectively positioning a work piece includes a first body and a second body. The work piece may be or include a sensor, such as a magnetic field sensor, although other types of work pieces are possible (e.g., optical elements, machinable bodies, etc.). The work piece may be coupled, directly or indirectly, to the first body, and the first and second bodies may include respective features that correspond to inner and outer portions of a joint. The joint may allow the first and second bodies to be selectively coupled and de-coupled from each other and may also allow the work piece to be accurately and rapidly secured in one of several possible locations and orientations. In some variations, the first or second body includes a seat configured to secure the work piece in a fixed position relative to the body.

The first body may include a first exterior surface and a boss extending from the first exterior surface along a boss axis and terminating in a boss end surface. The boss may include one or more boss perimeter surfaces that define a perimeter of the boss and extend from the first exterior surface to the boss end surface. The boss perimeter surfaces may define an inner mating profile for the joint that includes a plurality of radial lobes extending outward from the boss axis. The second body includes a second exterior surface and a pocket extending from the second exterior surface into the second body along a pocket axis. The pocket is shaped to receive the boss in a discrete number (e.g., a fixed integer number) of positions when the boss axis and the pocket axis are aligned. The pocket may, in some variations, terminate in a pocket end surface and include one or more pocket perimeter surfaces that define a perimeter of the pocket. The pocket perimeter surfaces may extend into the second body from the second exterior surface and may define an outer mating profile that mates with the inner mating profile defined by the boss perimeter surfaces.

In another general aspect, a process for selectively positioning the work piece includes inserting the boss of the first body into the pocket of the second body. During insertion, the boss perimeter surfaces of the boss contact the pocket perimeter surfaces of the pocket. Such contact may occur upon entry of the boss into the pocket or when the boss is inserted at least partially within the pocket. Contact between the boss and pocket perimeter surfaces may initiate the formation of the joint that, in some variations, is completed when the first exterior surface of the body contacts the second exterior surface of the second body. The process may include aligning the boss and pocket axes to be coincident. In these cases, the discrete number of positions may correspond to rotational positions of the boss about the coincident boss and pocket axes.

The systems and processes described herein may provide improvements or advantages over conventional approaches. For example, in certain cases the systems and processes may allow a work piece to be placed in a target position without the need for subsequent adjustments. It will be appreciated that the discrete number of positions may correspond to translational increments along a pathway (e.g., straight or curved), angular increments about a rotational axis, or both. As such, the stepped nature of the positions may avoid overshoot and undershoot conditions that are common to continuously variable positions (e.g., an infinite number of positions). These conditions may subsequently require the work piece to be iteratively adjusted in position to meet desired positional tolerances.

As another example, in certain cases the systems and processes may allow a work piece to be positioned with high accuracy and precision. The first and second bodies can be manufactured using processes with high accuracy and precision (e.g., CNC milling, 3D printing, injection molding, etc.). This high accuracy and precision can be incorporated into the final dimensions of the body surfaces (e.g., the first and second exterior surfaces, the boss and perimeter pocket surfaces, etc.), and as such, when the boss is inserted into the pocket, these surfaces can operate to place the work piece precisely and accurately into a target position. The position of the work piece may therefore not need to be validated after insertion, thus saving valuable time that would otherwise need to be required to complete the positioning process.

As yet another example, in certain cases the systems and processes may allow a human operator to quickly place a work piece in a target position, thus avoiding the expense of specialized equipment to do so (e.g., "pick-and-place"

equipment). The boss and pocket perimeter surfaces can define respective inner and outer mating profiles that are easily engaged when one or both of the first and second bodies are manipulated by hand (e.g., such as by the fingers). Moreover, the inner and outer mating profiles may be shaped so that the discrete number of positions includes locations and orientations that are readily selected by hand. These features can allow a human operator to rapidly transition the work piece between one target position to another while retaining a high confidence that the work piece is being positioned accurately and precisely.

In some implementations, multiple instances of the first and second bodies operate as a modular system whose constituents can be selectively joined and unjoined to position one or more work pieces. FIG. 1A presents a schematic diagram, shown in perspective view, of an example system 100 for selectively positioning a work piece, such as by inserting a boss into a pocket. The example system 100 includes bodies that have one or more bosses 102, one or more pockets 104, or both. The bodies may be formed of metal (e.g., aluminum and its alloys, steel, etc.), plastic (e.g., ABS, nylon, PMMA, PEEK, etc.), or some combination thereof. Other materials, however, are possible (e.g., ceramics). For cases in which the work piece is a magnetic field sensor, the bodies may be formed of non-magnetic material in whole or in part. The bodies may be manufactured using additive processes (e.g., 3D printing), subtractive process (e.g., CNC machining), or via mold processes (e.g., injection molding).

The example system 100 includes a reference body 106 (e.g., a reference plate) that includes pockets 104a disposed on a reference surface 108. The reference body 106 may, for example, be a planar body and may sit on a stable surface, such a ground surface, a workbench surface, a table surface, and so forth. The example system 100 also includes an intermediate body 110 (e.g., a rectangular block) having a first surface 112 opposite a second surface 114. The first surface 112 includes bosses that insert into the pockets 104a of the reference body 106. This insertion allows the intermediate body 110 to be accurately and precisely positioned along the reference surface 108 of the reference body 106. Such positioning may include discrete positions along two orthogonal axes (e.g., x and y axes) of the reference surface 108. The second surface 114 includes pockets 104b for coupling the intermediate body 110 to another body, such as a second intermediate body 116 (e.g., a right-angle attachment) or a work-holding body 118. The pockets 104b may also allow multiple instances of the work piece to be directly or indirectly coupled to the intermediate body 110 and possibly at the same time (e.g., in different locations). Each instance may be secured in a respective target position that, in many variations, also sets a target orientation. The target position (and possibly target orientation) may be relative to the reference surface 108 of reference body 108. However, other reference surfaces and bodies are possible.

In some implementations, the example system 100 is part of a position sensing system that includes one or more sensors (e.g., electric field sensors, magnetic field sensors, optical sensors, etc.). For example, the position sensing system may include one or more magnetic field sensors that serve as respective work pieces for the example system 100. Any number of the magnetic field sensors can be coupled to the reference body 106 at a given time and this coupling may be either direct or indirect, such as through the intermediate body 110, the second intermediate body 116, the work-holding body 118, or any combination thereof. The position sensing system may include a magnetic field generator, an example of which, is described in U.S. Pat. No. 10,276,289 entitled "Rotating a Permanent Magnetic in a Position Detection System." In some cases, the position sensing system is configured as described in U.S. Pat. No. 10,151, 606 entitled "Tracking Position and Movement Using a Magnetic Field." However, other configurations are possible.

In some implementations, the example system 100 is part of a work-holding system for a CNC machine (e.g., a 3-axis CNC mill). For example, when a body is manufactured with a boss thereon, additional machining operations may be required, such as to create a seat or other mating feature for mounting a sensor to the body. However, this machining may require that the body be de-coupled or removed from the CNC machine. As a result, the body may require a series of "setup" operations when later re-coupled to the CNC machine. Such operations may include registering the body (or surfaces thereof) to a machine coordinate system and establishing a working coordinate system for each cutting operation (or series of related cutting operations). These "set-up" operations may be necessary to allow the CNC machine to accurately cut additional features in the body. To complete the "set-up" operations, probes or gauges may be used. Moreover, the body may be contacted against a setting tool that is installed in a spindle of the CNC machine. Such contact may include aligning a surface of the body to be parallel to a motion axis of the CNC machine and measuring and offset between the machine coordinate system to the body to set the working coordinate system. However, in general, the "set-up" operations ensure that the CNC machine cuts a feature in the right position and that the body is oriented to a motion of the CNC machine such that the feature has the correct orientation when it is formed.

The bosses and pockets of the example system 100 may be configured to reduce or eliminate "set-up" operations during operation of the CNC machine. For example, a first body of the example system 100 may include a boss, and a mating pocket may be subsequently machined into a second body (e.g., the reference body 106, the intermediate body 110, the work-holding body 118, etc.). Such machining may involve cutting operations performed by the CNC machine while the second body is secured to the CNC machine. Since the mating pocket can be formed using a second working coordinate system, and since the second body can remain secured to the CNC machine after machining, the CNC machine can be programed to use the second working coordinate system for further cutting operations. For example, the boss of the first body can be inserted into the newly cut pocket of the second body (while still secured to the CNC machine) and a seat or other mating feature can be machined into the first body. The shape of the boss and the newly cut pocket can be configured to allow the first body to be accurately located relative to the second body. As such, "set-up" operations for the first body can be avoided that would otherwise be needed. The boss and newly cut pocket can also be configured to mate via a transition fit. The transition fit may be sufficiently tight to allow the first body to resist cutting forces (e.g., remain motionless) during the machining of the seat or other mating feature. As such, the need for work-holding devices (e.g., clamps, vises, etc.) may be reduced or eliminated, including the corresponding operations necessary to set up the work-holding devices.

Figure 1B:
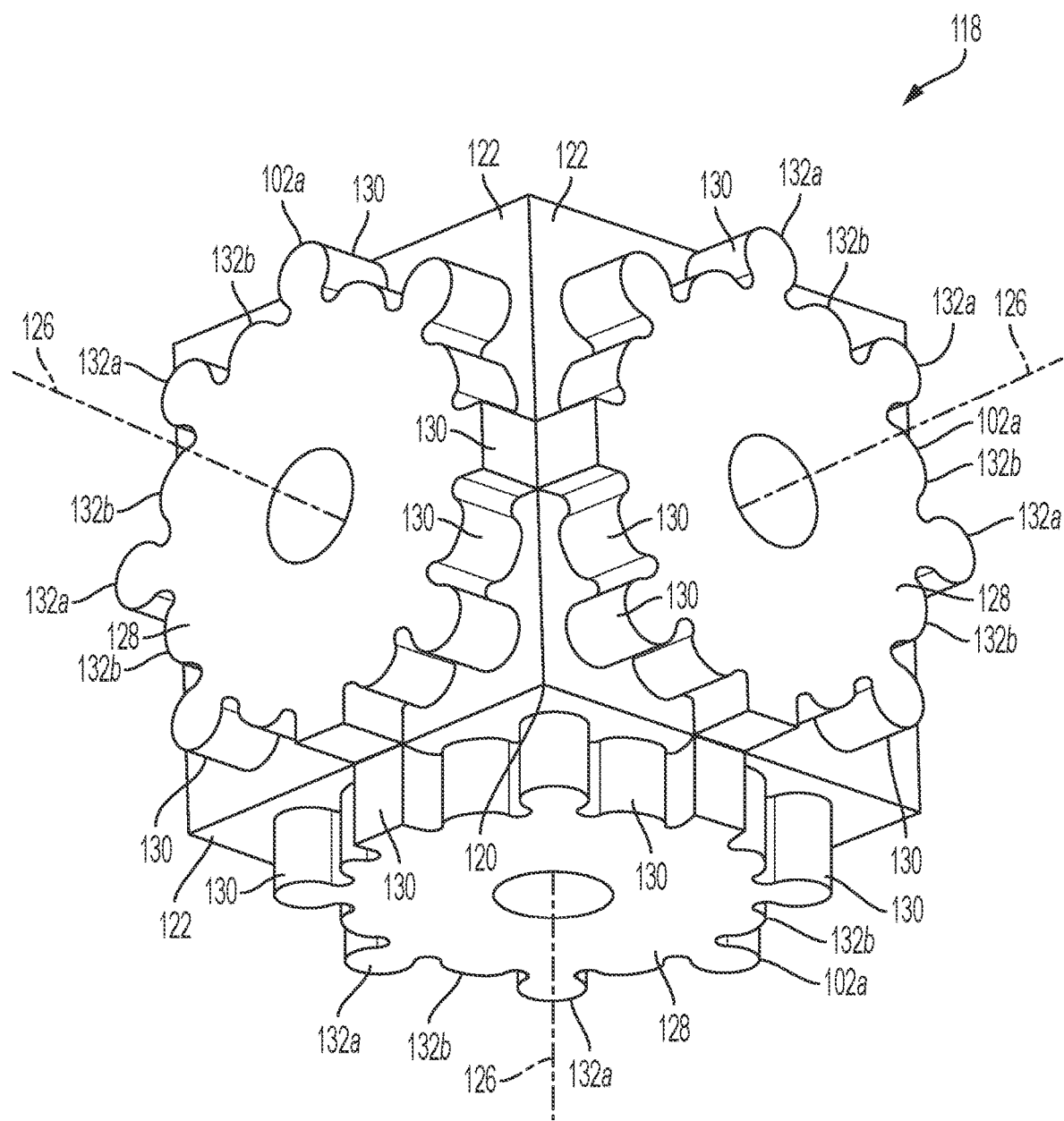
FIG. 1B is a schematic diagram of a work-holding body of the example system of FIG. 1A.

In some variations, such as shown in FIGS. 1A and 1B, the work-holding body 118 is cubic-shaped and includes a corner 120 that is shared by three exterior surfaces 122. The three exterior surfaces 122 include respective bosses 102a for coupling to another body of the example system 100

(e.g., the reference body 106, the intermediate body 110, etc.). In these instances, the work-holding body 118 may include a seat 124 configured to hold (e.g., via screws, clamps, adhesive, etc.) a work piece in a fixed position relative to the work-holding body 118. The fixed position may also set an orientation of the work piece relative to the work-holding body 118. Examples of possible positions and orientations for the work-holding body 118 are described further in relation to FIGS. 2A-2B. In some variations, the seat 124 is configured to hold the work piece such that its center is equidistant from the three exterior surfaces 122. For example, the seat 124 may position the center of a sensor (e.g., a magnetic field center) equidistant from the three exterior surfaces 122. Such positioning may allow the center of sensor to be maintained at a constant reference point when a boss 102a is inserted in a pocket 104 regardless of the orientation of the work-holding body 118.

To secure the work piece in a desired target position, a boss 102a of the work-holding body 118 may be inserted into a pocket 104 of another body (e.g., the reference body 106, the intermediate body 110, the second intermediate body 116, etc.). Such insertion is facilitated by an inner mating profile of the boss 102a that allows the boss 102a to fit within an outer mating profile some or all of the pockets 104. The inner mating profile and the outer mating profile may be configured to define a transition fit between the boss 102a and the pocket 104. The transition fit may ensure that an external force (e.g., a user- or machine-applied force) is required to remove the boss 102a from the pocket 104, thereby preventing the work-holding body 118 from easily decoupling from the other body. Other types of fits, however, are possible.

Figure 1C:
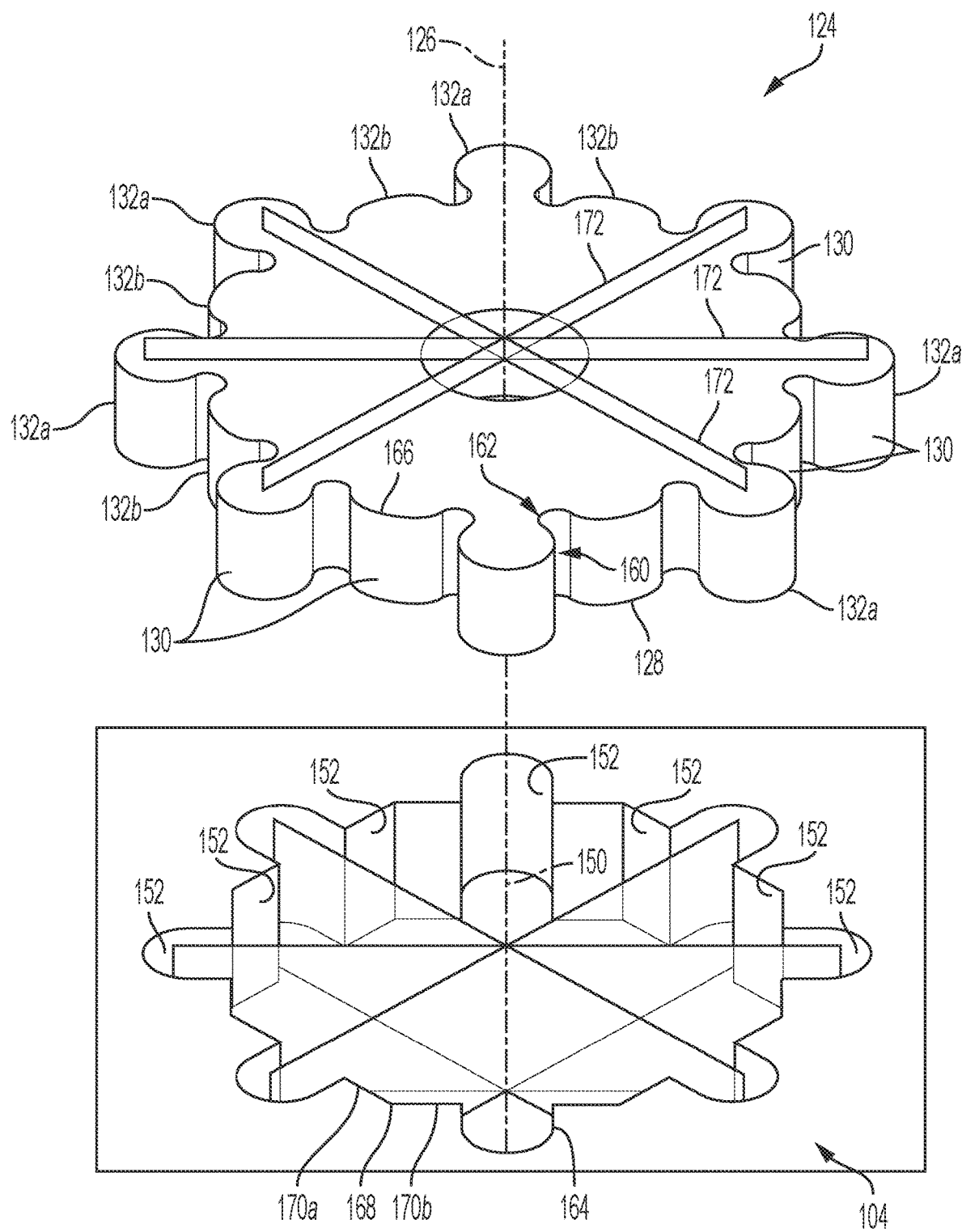
FIG. 1C is a schematic diagram, shown in perspective view, of a boss of the work-holding body of FIG. 1B aligned to mate with a pocket of another body of the example system of FIG. 1A.

As shown in FIGS. 1B and 1C, the example boss 102a extends outward from an exterior surface 122 along a boss axis 126 and terminate in a boss end surface 128. The boss axis 126 may be perpendicular to the exterior surface 122. The example boss 102a includes boss perimeter surfaces 130 that define a perimeter of the boss 102a and extend between the exterior surface 122 and the boss end surface 128. The boss perimeter surfaces 130 define an inner mating profile that has radial lobes 132 extending outward from the boss axis 126. The example radial lobes 132 may be uniformly distributed around the perimeter of the boss 102a and may correspond to precise, predetermined angles about the boss axis 126. In many variations, the number of radial lobes 132 sets the number of rotational positions available to the work-holding body 118 about the boss axis 126. In operation, the example radial lobes 132 may allow facile and accurate positioning of the work-holding body 118 into a desired rotational position (or orientation), such as by action of a human hand. Such positioning may include transitioning the work-holding body 118 between rotational positions.

The corresponding pocket 104 extends from a second exterior surface (e.g., reference surface 108, second surface 114, etc.) into a second body (e.g., reference body 106, intermediate body 110, etc.) along a pocket axis 150. The pocket axis 150 may be perpendicular to the second exterior surface. In some variations, such as shown in FIG. 1C, the pocket 104 extends completely through the second body, forming a through-hole. However, in other variations, the pocket 104 extends only partially through the second body. In these latter variations, the pocket 104 may extend from the second exterior surface to a pocket end surface, which sets a depth of the pocket 104. In many variations, the depth of the pocket 104 is greater than a length of the boss 102a (e.g., an extension length of the boss 102a from the exterior surface 122). Such a configuration may ensure that contact between the exterior surface 122 and the second exterior surface terminates the motion of the boss 102a into the pocket 104 during insertion. The configuration may also ensure that these surfaces, once contacted, define a reference plane for the example system 100.

In many implementations, the pocket 104 is shaped to receive the boss 102a in a discrete number (e.g., a fixed integer number) of positions when the boss axis 126 and the pocket axis are aligned. The positions may each include one or both of a rotational position (or orientation) and a translational position. To do so, the example pocket 104 includes pocket perimeter surfaces 152 that define a perimeter of the pocket 104 and extend into the second body from the second exterior surface. The example pocket perimeter surfaces 152 define an outer mating profile that mates with the inner mating profile defined by the boss perimeter surfaces 130.

Figure 1D:
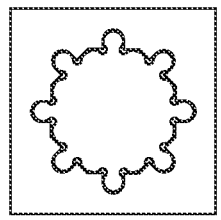
FIG. 1D is a schematic diagram, in cross-sectional view, of example inner and outer mating profiles for the boss and pocket of FIG. 1C.
Figure 1D:
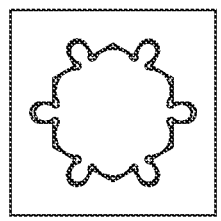
Figure 1D:
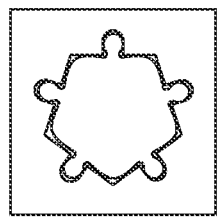
Figure 1D:
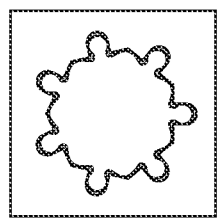
Figure 1D:
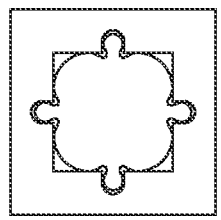
Figure 1D:
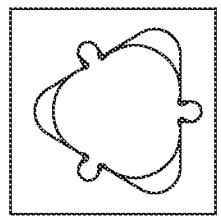

In some implementations, such as shown in FIG. 1C, the boss 102a and the pocket 104 are configured such that the boss and pocket axes 126, 150 are coincident when the boss 102a is received into the pocket 104. In these implementations, the discrete number of positions may correspond to rotational positions of the boss 102a about the coincident boss and pocket axes 126, 150. In some implementations, the radial lobes 132 include two or more types of radial lobes such as, for example, the first and second radial lobes 132a, 132b shown in FIG. 1C, which alternate in sequence along the inner mating profile. The first radial lobes 132a may be longer than the second radial lobes 132b, although other configurations are possible. In these implementations, the discrete number of positions may correspond to the number of the first radial lobes 132a. FIG. 1D presents a schematic diagram, in cross-sectional view, of example inner and outer mating profiles for the boss 102a and pocket 104 of FIG. 1C. In the example shown in FIG. 1D, the boss 102a is inserted into the pocket 104 and the cross-sectional view is defined by a plane that is coincident with the exterior surface 122 of the work-holding body 118.

Figure 1E:
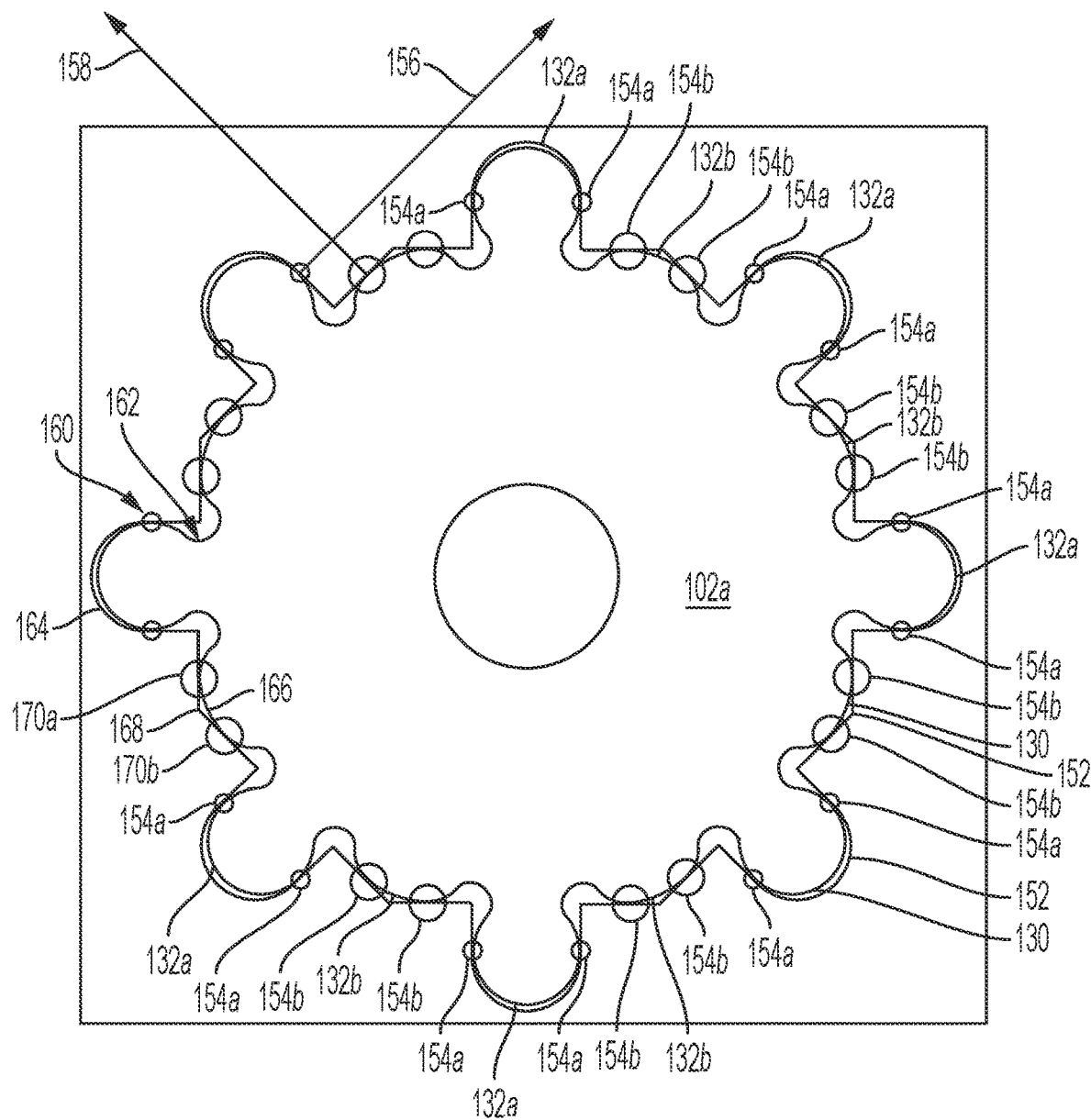
FIG. 1E is a schematic diagram, in cross-sectional view, of the boss and pocket of FIG. 1C mated to each other via insertion.

During insertion of the example boss 102a into the example pocket 104, the boss perimeter surfaces 130 contacts the pocket perimeter surfaces 152. Such contact may serve to secure the work-holding body 118 to another body of the example system 100 (e.g., the intermediate body 110). FIG. 1E presents a schematic diagram, in cross-sectional view, of the boss 102a and pocket 104 of FIG. 1C mated to each other via insertion. Circles indicate regions of contact between the inner and outer mating profiles. The inner and outer mating profiles may be configured to set a type of contact between boss and pocket perimeter surfaces 130, 152. For example, the first radial lobes 132a may be configured to engage the outer mating profile of the pocket 104 through respective pairs of first surface contacts 154a. Similarly, the second radial lobes 132b may be configured to engage the outer mating profile of the pocket 104 through respective pairs of second surface contacts 154b. In some variations, one or both of the first and second surface contacts 154a, 154b are lineal contacts. In these variations, the lineal contact may occur substantially along a line (e.g., the contact area has a length to width ratio greater than 10 or another threshold value). In some variations, one or both of the first and second surface contacts 154a, 154b are areal contacts. FIG. 1E shows an example where the first surface contacts 154a are lineal contacts and the second surface contacts 154b are areal contacts. However, other types and combinations of contacts are possible.

The inner and outer mating profiles may also be configured to set a number of contact regions between boss and pocket perimeter surfaces 130, 152. FIG. 1E depicts the boss 102a making eight pair of first surface contacts 154a and eight pair of second surface contacts 154b with the pocket 104. However, other numbers of contact regions are possible. This large multiplicity of contacts may allow the pocket 104 to strongly resist translational and rotational motion of the boss 102a within a plane perpendicular to the coincident boss and pocket axes 126, 150. The work-holding body 118 may thus be effectively constrained to move only along a direction perpendicular to the axes, such as for insertion and removal.

The inner and outer mating profiles may also be configured to control a direction of forces applied between the pocket 104 and boss 102a. For example, the first and second surface contacts 154a, 154b may be configured such that adjacent pairs of first and second surface contacts face outward from the inner mating profile along respective directions 156, 158 that are perpendicular to each other. This perpendicular orientation may allow the pocket 104 to efficiently apply holding or constraining forces to the boss 102a and thus allow the work-holding body 118 to be accurately and precisely positioned during use.

The inner and outer mating profiles may also be configured to provide other features to the boss and pocket perimeter surfaces 130, 152. For example, the boss perimeter surfaces 130 may define an inner mating profile that includes rounded surfaces for the plurality of radial lobes 132. The rounded surfaces may prevent wear that might otherwise be caused by edges of the inner mating profile repeatedly contacting the pocket perimeter surfaces 152 during a lifetime of the work-holding body 118. The rounded surfaces may also reduce the risk of damage to the boss perimeter surfaces 130, such as might be caused by an accidental drop of the work-holding body 118 or hard contact of the work-holding body 118 with another body. Such wear and damage could reduce the accuracy and precision at which the work-holding body 118 could be positioned when the boss 102a is inserted into the pocket 104.

In some implementations, the boss perimeter surfaces 130 define head and neck portions 160, 162 for each first radial lobe 132a. The head portions 160 may have a width greater than their respective neck portions 162. In these implementations, the pocket perimeter surfaces 152 define a U-shaped notch 164 for each first radial lobe. The U-shaped notch 164 is configured to contact the head portion 160 of one first radial lobe 132a on opposite sides when the boss 102a is seated within the pocket 104. In some implementations, each second radial lobe 132b is defined by an outward bowed surface 166 of the boss perimeter surfaces 130. In such implementations, the pocket perimeter surfaces 152 define a V-shaped notch 168 for each second radial lobe 132b. The V-shaped notch 168 includes a pair of flat surfaces 170a, 170b configured to contact respective half portions of an outward bowed surface 166 when the boss 102a is seated within the pocket 104.

The lobes 132 may include one or more individual lobes that are shaped to be symmetrical about a plane, such as a plane of bisection. The plane of bisection may establish opposite sides for one or more of the individual lobes and may, in some instances, also define symmetrical halves of the boss 102a. The opposite sides may allow the one or more individual lobes to provide symmetrical surfaces for contacting the pocket perimeter surfaces 152, such as for engaging the U-shaped notch 164, the V-shaped notch 168, and so forth. In some variations, such as shown in FIG. 1C, each of the first radial lobes 132a is bisected by a plane of symmetry 172 defining symmetrical halves of the boss 102a. In these variations, the boss axis 126 may serve as a common axis of intersection for the planes of symmetry 172. As such, the planes of symmetry 172 may also bisect each of the U-shaped notches 164 when the boss and pocket axes 126, 150 are coincident. When doing so, the planes of symmetry 172 may also define symmetrical halves of the pocket 104.

Figure 1F:
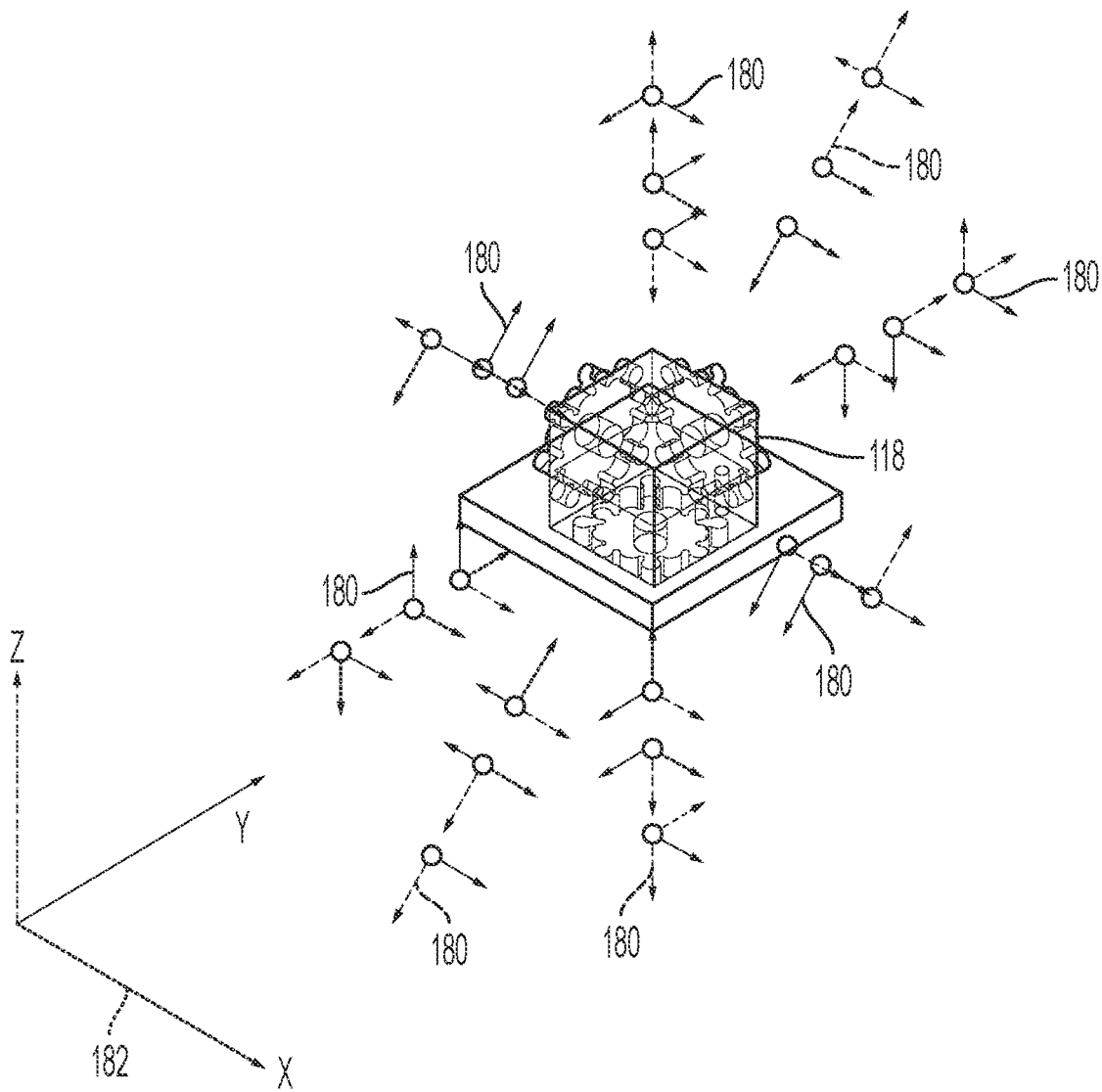
FIG. 1F is a schematic diagram, in perspective view, of example positions for the work-holding body of FIG. 1B when using a boss to couple to a pocket of another body of the example system of FIG. 1A.

FIG. 1F shows a schematic diagram, in perspective view, of example positions 180 for the work-holding body 118 when using the boss 102a to couple to the pocket 104 of another body of the example system 100. A reference position is shown by a set of three orthogonal axes 182, which define an x, y, and z basis for the work-holding body 118. Due to the symmetry of the eight first radial lobes 132a and the eight second radial lobes 132b, the work-holding body 118 may occupy one of eight rotational positions about the coincident boss and pocket axes 126, 150. Moreover, due to an instance of the boss 102a being present on each of the three exterior surfaces 122, three rotational axes are accessible to the work-holding body 118. The example work-holding body 118 may thus position the work piece in any one of 24 rotational positions when secured to another body of the example system 100.

Figure 1G:
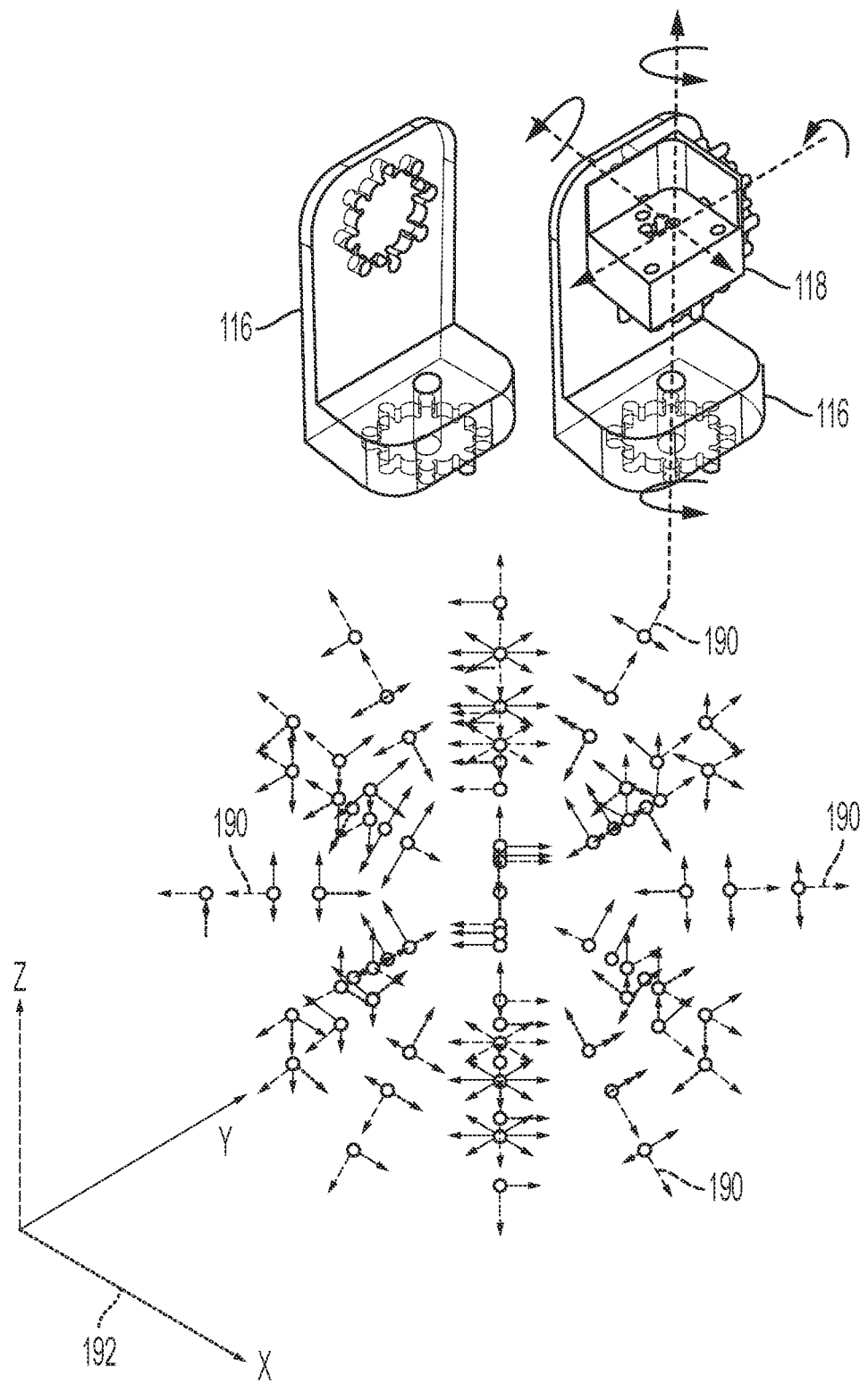
FIG. 1G is a schematic diagram, in perspective view, of example positions for the work-holding body of FIG. 1F, but when coupled to an intermediate body of the example system of FIG. 1A.

The 24 rotational positions shown as an example in FIG. 1F may be expanded in number by using an additional body to increase the degrees of rotational freedom. FIG. 1G presents a schematic diagram, in perspective view, of example positions 190 for the work-holding body 118, but when coupled to the second intermediate body 116 of the example system 100. A reference position is shown by a set of three orthogonal axes 192, which defines an x, y, and z basis for the work-holding body 118. The boss 102 of the second intermediate body 116 introduces a fourth rotational degree of freedom to the three rotational degrees of freedom already associated with the work-holding body 118. The fourth degree of freedom allows the second intermediate body 116 to occupy one of eight secondary rotational positions about its boss axis. These positions, when combined with the 24 rotational positions possible for the work-holding body 118, expand the rotational positions to 192 possible positions. Thus, by combining multiple bodies, the example system 100 can increase the number of target positions possible for the work piece.

Figure 2:
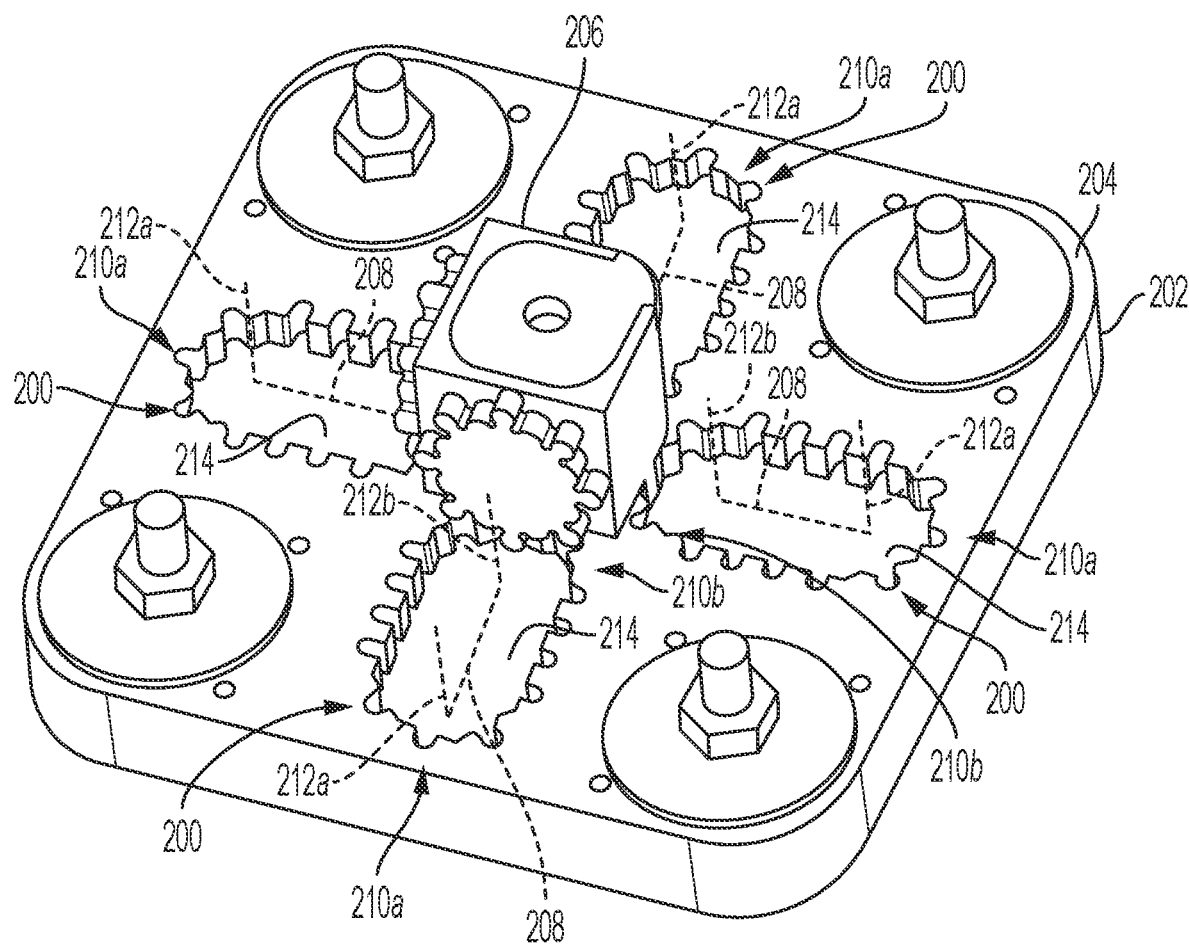
FIG. 2 is a schematic view, in perspective view, of an example pocket in a reference body that has an elongated shape.

Although FIGS. 1F and 1G present the target position of the work piece in the context of rotational positions, translational positions may also be selected (including in addition to rotational positions). FIG. 2 presents a schematic view, in perspective view, of an example pocket 200 that has an elongated shape in a reference body 202. The reference body 202 includes four instances of the example pocket 200 that partition a reference surface 204 of the reference body into equal-sized quadrants. However, other numbers and arrangements of the example pocket 200 are possible. The example pocket 200 is configured to selectively position a work-holding body 206 in one or both of a target translational position and a target rotational position. The work-holding body 206 may be analogous to the work-holding body 118 described in relation to FIGS. 1A-1G. The example pocket 200 extends along a lengthwise axis 208 between first and second pocket ends 210a, 210b. The first and second pocket ends 210a, 210b may be associated with respective out-of-plane axes 212a, 212b that intersect the lengthwise axis 208 and are perpendicular to a pocket end surface 214 of the pocket 200.

The example pocket 200 is shaped to receive a boss of the work-holding body 204 in a discrete number of positions when a boss axis of the boss is aligned with the axes of the example pocket 200. Such alignment may include a perpendicular alignment of the boss axis relative to the lengthwise axis 208 and a parallel alignment of the boss axis relative to the out-of-plane axes 212a, 212b. The discrete number of positions may include a discrete number of translational and rotational positions. For example, an outer mating profile of the example pocket 200 may be configured to engage an inner mating profile of the boss to hold the work-holding body 206 in one of a series of translational increments along the lengthwise axis 208. The outer mating profile of the example pocket 200 may also be configured to engage the inner mating profile of the boss to hold the work-holding body 206 in one of a series of rotational increments about the boss axis. In these cases, the example pocket 202 may include pocket perimeter surfaces that contact at least two radial lobes defined by boss perimeter surfaces of the boss. The at least two radial lobes may be on opposite sides of the boss. However, when the work-holding body 118 is disposed at the first pocket end 210a or the second pocket end 212a, the pocket perimeter surfaces may contact radial lobes along an arced portion of the boss perimeter surfaces. These radial lobes may or may not be on opposite sides of the boss.

Figure 3A:
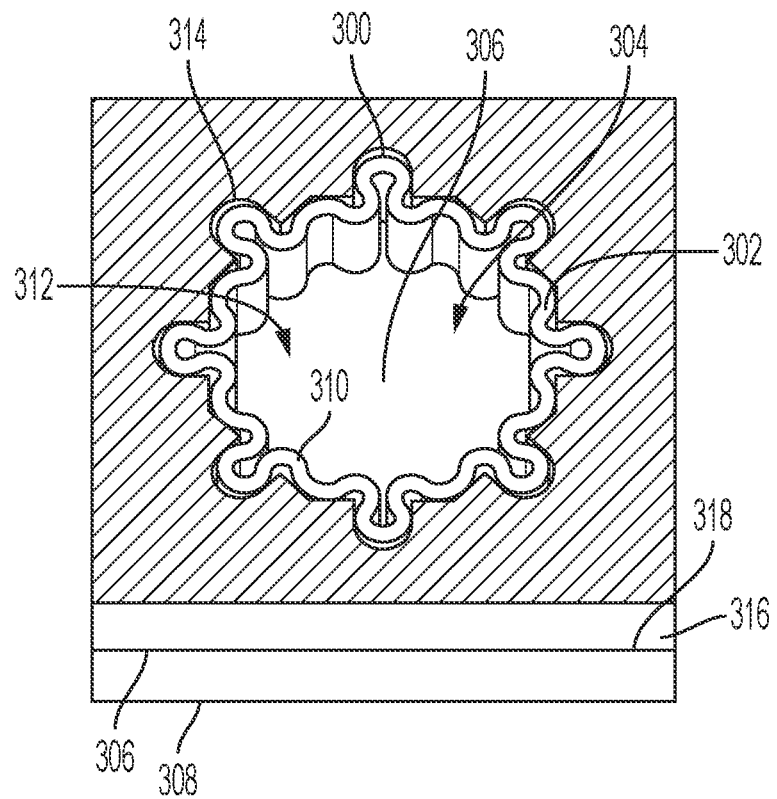
FIG. 3A is a schematic diagram, in cross-sectional view, of an example hollow boss whose shape is defined by a boss perimeter wall that bounds an unfilled volume.

In some implementations, the bodies of the example system 100 include bosses 102 that are solid. In other implementations, some or all of bosses 102 are hollow (e.g., open). For example, FIG. 3A presents a schematic diagram, in cross-sectional view, of an example hollow boss 300 whose shape is defined by a boss perimeter wall 302 that bounds an unfilled volume 304. The boss perimeter wall 302 may extend between a first exterior surface 306 of a first body 308 (e.g., a reference body, an intermediate body, a work-holding body, etc.) and a boss end surface 310. In FIG. 3A, the cross-sectional view is defined by a plane that is coincident with the boss end surface 310. The boss perimeter wall 302 includes one or more boss perimeter surfaces and encircles an opening 312 of the example hollow boss 300. The one or more boss perimeter surfaces may be on an exterior side of the boss perimeter wall 302, and the opening 312 may provide access to the unfilled volume 304. As shown in FIG. 3A, the example hollow boss 300 can be inserted into a pocket 314, which extends into a second body 316 from a second exterior surface 318 of the second body 316. It will be appreciated that the boss perimeter wall 302 may allow for reliable mating accuracy with the pocket 314. Moreover, a good retention force may be achieved with the boss perimeter wall 302, including a higher acceptable tolerance range between the boss 300 and pocket 314. In some variations, the example hollow boss 300 includes a boss end wall that covers the opening 312 and includes (or defines) the boss end surface 310. In these variations, the boss perimeter wall 302 may extend between the first exterior surface 306 and the boss end wall.

Figure 3B:
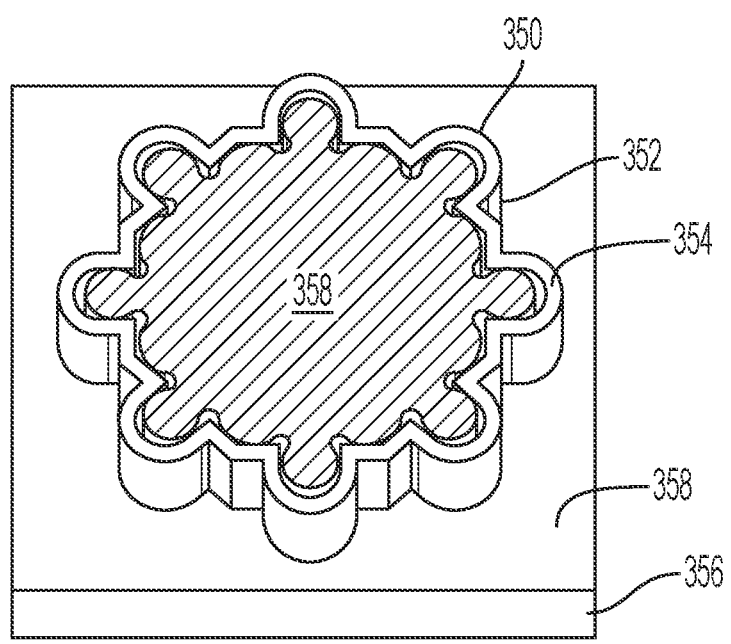
FIG. 3B is a schematic diagram, in cross-sectional view, of an example pocket that is defined by a pocket perimeter wall.

In some implementations, the pockets of the example system 100 are defined by a wall that extends outward from a body of the example system 100. For example, FIG. 3B presents a schematic diagram, in cross-sectional view, of an example pocket 350 that is defined by a pocket perimeter wall 352. The pocket perimeter wall 352 extends from a second exterior surface 354 of a second body 356 to a third exterior surface 358 of the second body 356. Moreover, the pocket perimeter wall 352 encircles the example pocket 350 and includes one or more pocket perimeter surfaces on an inner side of the pocket perimeter wall 352. FIG. 3B depicts a boss 360 inserted into the example pocket 350. The boss 360 may extend from a first exterior surface of a first body and include boss perimeter surfaces that contact the one or more pocket perimeter surfaces. During such contact, the pocket perimeter wall 352 may allow for reliable mating accuracy with the boss 360. A good retention force may also be achieved with the pocket perimeter wall 352, including a higher acceptable tolerance range between the pocket 350 and the boss 360. Although FIG. 3B depicts the boss 360 as being solid, the boss 360 may, in some instances, be hollow, such as shown in FIG. 3A. The cross-sectional view of FIG. 3B is defined by a plane that is coincident with the first exterior surface of the first body.

During use, the bodies of the example system 100 may be joined and unjoined as needed to selectively position the work piece in the target position. Depending on whether a boss 102 or a pocket 104 is involved, the bodies may serve as either a first body or a second body when coming together to form the joint. In some implementations, a process for selectively positioning the work piece includes inserting a boss of a first body into a pocket of a second body. The boss extends along a boss axis from a first exterior surface of the first body to a boss end surface of the boss, which terminates in the boss. The pocket extends into the second body from a second exterior surface of the second body along a pocket axis. The pocket is shaped to receive the boss in a discrete number of positions when the boss axis and the pocket axis are aligned. In some variations, inserting the boss into the pocket includes contacting the first exterior surface with the second exterior surface. Such contact may stop motion of the boss into the pocket and set a target depth of the boss in the pocket.

In some cases, the process for selectively positioning the work piece also includes contacting boss perimeter surfaces of the boss with pocket perimeter surfaces of the pocket when the boss is inserted at least partially within the pocket. The boss perimeter surfaces may define a perimeter of the boss and extend between the first exterior surface and the boss end surface. The boss perimeter surfaces may also define an inner mating profile that includes a plurality of radial lobes extending outward from the boss axis. The pocket perimeter surfaces may define a perimeter of the pocket and extend into the second body from the second exterior surface. The pocket perimeter surfaces may also define an outer mating profile that mates with the inner mating profile defined by the boss perimeter surfaces. In some variations, the first or second body includes a seat configured to secure the work piece in a fixed position relative to the body. In these variations, the process may include coupling the work piece to the seat in the fixed position. If the work piece is already coupled to the seat, the process may include uncoupling the work piece from the seat to remove the work piece from the body.

The first body may be in a first position when the boss is inserted into the pocket. In this case, to unjoin the first and second bodies, the process may include removing the boss from the pocket to disengage the boss and pocket perimeter surfaces. To rejoin the first and second bodies to a new target position, the process may then include displacing the first body relative to the second body by one or both of translating and rotating the first body relative to the second body and re-inserting the boss into the pocket to place the first body in a second, different position.

In some implementations, transitioning between target positions may include transitioning between rotational positions to establish a new orientation for the work piece. For example, the boss may be in a first rotational position when inserted into the pocket. In these cases, the first rotational position may place the first body in a first orientation relative to the second body. To establish the new orientation, the process may then include removing the boss from the pocket to disengage the boss and pocket perimeter surfaces. The process may also include rotating the first body about the boss axis and relative to the second body and re-aligning the boss and pocket axes to be coincident. The boss can be subsequently re-inserted into the pocket to orient the boss in a second, different rotational position. The second rotational position may place the first body in a second, different orientation relative to the second body.

In some aspects of what is described, a system for selectively positioning a work piece may be described by the following examples:

Example 1. A system for selectively positioning a work piece, the system comprising:
  a first body comprising:
    a first exterior surface, and
    a boss extending from the first exterior surface along a boss axis and comprising:
      a boss end surface terminating the boss, and
      boss perimeter surfaces defining a perimeter of the boss and extending between the first exterior surface and the boss end surface, the boss perimeter surfaces defining an inner mating profile that comprises a plurality of radial lobes extending outward from the boss axis; and
  a second body comprising:
    a second exterior surface,
    a pocket extending from the second exterior surface into the second body along a pocket axis, the pocket being shaped to receive the boss in a discrete number of positions when the boss axis and the pocket axis are aligned, the pocket comprising:
      pocket perimeter surfaces defining a perimeter of the pocket and extending into the second body from the second exterior surface, the pocket perimeter surfaces defining an outer mating profile that mates with the inner mating profile defined by the boss perimeter surfaces.

Example 2. The system of example 1,
  wherein boss and the pocket are configured such that the boss and pocket axes are coincident when the boss is received into the pocket; and
  wherein the discrete number of positions correspond to rotational positions of the boss about the coincident boss and pocket axes.

Example 3. The system of example 1 or example 2,
  wherein the plurality of radial lobes comprises first and second radial lobes alternating in sequence along the inner mating profile, the first radial lobes longer than the second radial lobes; and
  wherein the discrete number of positions corresponds to the number of the first radial lobes.

Example 4. The system of example 3,
  wherein the first radial lobes are configured to engage the outer mating profile of the pocket through respective pairs of first surface contacts; and
  wherein the second radial lobes are configured to engage the outer mating profile of the pocket through respective pairs of second surface contacts.

Example 5. The system of example 4, wherein one or both the first and second surface contacts are lineal contacts.

Example 6. The system of example 4, wherein one or both the first and second surface contacts are areal contacts.

Example 7. The system of any one of example 4 or any one of examples 5-6, wherein the first and second surface contacts are configured such that adjacent pairs of first and second surface contacts face outward from the inner mating profile along respective directions that are perpendicular to each other.

Example 8. The system of example 3 or any one of examples 4-7,
  wherein the boss perimeter surfaces define head and neck portions for each first radial lobe, the head portions having a width greater than their respective neck portions;
  and wherein the pocket perimeter surfaces define a U-shaped notch for each first radial lobe, the U-shaped notch configured to contact the head portion of one first radial lobe on opposite sides when the boss is seated within the pocket.

Example 9. The system of example 3 or any one of examples 4-8,
  wherein each second radial lobe is defined by an outward bowed surface of the boss perimeter surfaces; and
  wherein the pocket perimeter surfaces define a V-shaped notch for each second radial lobe, the V-shaped notch comprising a pair of flat surfaces configured to contact respective half portions of an outward bowed surface when the boss is seated within the pocket.

Example 10. The system of example 3 or any one of examples 4-9,
  wherein each of the first radial lobes are bisected by a plane of symmetry defining symmetrical halves of the boss; and
  wherein the boss axis serves as a common axis of intersection for the planes of symmetry.

Example 11. The system of example 1 or any one of examples 2-10, wherein the inner mating profile and the outer mating profile are configured to define a transition fit between the boss and the pocket.

Example 12. The system of example 1 or any one of examples 2-11, wherein the first body comprises:
  a corner;
  second and third exterior surfaces sharing the corner in common with the first exterior surface; and
  an instance of the boss on each of the second and third exterior surfaces.

Example 13. The system of example 1 or any one of examples 2-12, wherein the boss is hollow and comprises:
  a boss perimeter wall encircling an opening of the boss and defining the boss perimeter surfaces, the boss perimeter wall extending between the first exterior surface and the boss end surface.

Example 14. The system of example 13, wherein the boss comprises a boss end wall covering the opening of the boss and comprising the boss end surface.

Example 15. The system of example 1 or any one of examples 2-14, wherein the second body comprises:
  a third exterior surface; and
  a pocket perimeter wall encircling the pocket and comprising the pocket perimeter surfaces on an inner side of the pocket perimeter wall, the pocket perimeter wall extending between the second and third exterior surfaces.

Example 16. The system of example 1 or any one of examples 2-15, wherein the first or second body comprises a seat configured to secure the work piece in a fixed position relative to the body.

In some aspects of what is described, a method for selectively positioning a work piece may be described by the following examples:

Example 17. A method for selectively positioning a work piece, the method comprising:
 inserting a boss of a first body into a pocket of a second body, wherein:
  the boss extends along a boss axis from a first exterior surface of the first body to a boss end surface of the boss, the boss end surface terminating the boss, and
  the pocket extends into the second body from a second exterior surface of the second body along a pocket axis, the pocket being shaped to receive the boss in a discrete number of positions when the boss axis and the pocket axis are aligned; and
 contacting boss perimeter surfaces of the boss with pocket perimeter surfaces of the pocket when the boss is inserted at least partially within the pocket, wherein:
  the boss perimeter surfaces define a perimeter of the boss and extend between the first exterior surface and the boss end surface, the boss perimeter surfaces defining an inner mating profile that comprises a plurality of radial lobes extending outward from the boss axis, and
  the pocket perimeter surfaces define a perimeter of the pocket and extend into the second body from the second exterior surface, the pocket perimeter surfaces defining an outer mating profile that mates with the inner mating profile defined by the boss perimeter surfaces.

Example 18. The method of example 17, wherein inserting the boss into the pocket comprises contacting the first exterior surface with the second exterior surface.

Example 19. The method of example 17 or example 18,
 wherein the first body is in a first position when the boss is inserted into the pocket; and
 wherein the method comprises:
  removing the boss from the pocket to disengage the boss and pocket perimeter surfaces,
  displacing the first body relative to the second body by one or both of translating and rotating the first body relative to the second body, and
  re-inserting the boss into the pocket to place the first body in a second, different position.

Example 20. The method of example 17 or example 18, comprising:
 aligning the boss and pocket axes to be coincident;
 wherein the discrete number of positions correspond to rotational positions of the boss about the coincident boss and pocket axes.

Example 21. The method of example 20,
 wherein the boss is in a first rotational position when the boss is inserted into the pocket, the first rotational position placing the first body in a first orientation relative to the second body; and
 wherein the method comprises:
  removing the boss from the pocket to disengage the boss and pocket perimeter surfaces,
  rotating the first body about the boss axis and relative to the second body,
  re-aligning the boss and pocket axes to be coincident, and
  re-inserting the boss into the pocket to orient the boss in a second, different rotational position, the second rotational position placing the first body in a second, different orientation relative to the second body.

Example 22. The method of example 17 or any one of examples 18-21,
 wherein the first or second body comprises a seat configured to secure the work piece in a fixed position relative to the body; and
 wherein the method comprises coupling the work piece to the seat in the fixed position.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A system for selectively positioning a work piece, the system comprising:
 a first body comprising:
  a first exterior surface, and
  a boss extending from the first exterior surface along a boss axis and comprising:
   a boss end surface terminating the boss, and
   boss perimeter surfaces defining a perimeter of the boss and extending between the first exterior surface and the boss end surface, the boss perimeter surfaces defining an inner mating profile that comprises a plurality of radial lobes extending outward from the boss axis; and
 a second body comprising:
  a second exterior surface, a pocket extending from the second exterior surface into the second body along a pocket axis, the pocket being shaped to receive the boss in a discrete number of positions when the boss axis and the pocket axis are aligned, the pocket comprising:
   pocket perimeter surfaces defining a perimeter of the pocket and extending into the second body from the second exterior surface, the pocket perimeter surfaces defining an outer mating profile that mates with the inner mating profile defined by the boss perimeter surfaces, the outer mating profile comprising, for each radial lobe of the inner mating profile, a notch that is configured to receive the radial lobe therein.

2. The system of claim 1,
 wherein boss and the pocket are configured such that the boss and pocket axes are coincident when the boss is received into the pocket; and wherein the discrete number of positions correspond to rotational positions of the boss about the coincident boss and pocket axes.

3. The system of claim 1,
wherein the plurality of radial lobes comprises first and second radial lobes alternating in sequence along the inner mating profile, the first radial lobes longer than the second radial lobes; and
wherein the discrete number of positions corresponds to the number of the first radial lobes.

4. The system of claim 3,
wherein the first radial lobes are configured to engage the outer mating profile of the pocket through respective pairs of first surface contacts; and
wherein the second radial lobes are configured to engage the outer mating profile of the pocket through respective pairs of second surface contacts.

5. The system of claim 4, wherein one or both the first and second surface contacts are lineal contacts.

6. The system of claim 4, wherein one or both the first and second surface contacts are areal contacts.

7. The system of claim 4, wherein the first and second surface contacts are configured such that adjacent pairs of first and second surface contacts face outward from the inner mating profile along respective directions that are perpendicular to each other.

8. The system of claim 3,
wherein the boss perimeter surfaces define head and neck portions for each first radial lobe, the head portions having a width greater than their respective neck portions; and
wherein the pocket perimeter surfaces define a U-shaped notch for each first radial lobe, the U-shaped notch configured to contact the head portion of one first radial lobe on opposite sides when the boss is seated within the pocket.

9. The system of claim 3,
wherein each second radial lobe is defined by an outward bowed surface of the boss perimeter surfaces; and
wherein the pocket perimeter surfaces define a V-shaped notch for each second radial lobe, the V-shaped notch comprising a pair of flat surfaces configured to contact respective half portions of an outward bowed surface when the boss is seated within the pocket.

10. The system of claim 3,
wherein each of the first radial lobes are bisected by a plane of symmetry defining symmetrical halves of the boss; and
wherein the boss axis serves as a common axis of intersection for the planes of symmetry.

11. The system of claim 1, wherein the inner mating profile and the outer mating profile are configured to define a transition fit between the boss and the pocket.

12. The system of claim 1, wherein the first body comprises:
a corner;
second and third exterior surfaces sharing the corner in common with the first exterior surface; and
an instance of the boss on each of the second and third exterior surfaces.

13. The system of claim 1, wherein the boss is hollow and comprises:
a boss perimeter wall encircling an opening of the boss and defining the boss perimeter surfaces, the boss perimeter wall extending between the first exterior surface and the boss end surface.

14. The system of claim 1, wherein the second body comprises:
a third exterior surface; and
a pocket perimeter wall encircling the pocket and comprising the pocket perimeter surfaces on an inner side of the pocket perimeter wall, the pocket perimeter wall extending between the second and third exterior surfaces.

15. The system of claim 1, wherein the first or second body comprises a seat configured to secure the work piece in a fixed position relative to the body.

16. A method for selectively positioning a work piece, the method comprising:
inserting a boss of a first body into a pocket of a second body, wherein:
the boss extends along a boss axis from a first exterior surface of the first body to a boss end surface of the boss, the boss end surface terminating the boss, and
the pocket extends into the second body from a second exterior surface of the second body along a pocket axis, the pocket being shaped to receive the boss in a discrete number of positions when the boss axis and the pocket axis are aligned; and
contacting boss perimeter surfaces of the boss with pocket perimeter surfaces of the pocket when the boss is inserted at least partially within the pocket, wherein:
the boss perimeter surfaces define a perimeter of the boss and extend between the first exterior surface and the boss end surface, the boss perimeter surfaces defining an inner mating profile that comprises a plurality of radial lobes extending outward from the boss axis, and
the pocket perimeter surfaces define a perimeter of the pocket and extend into the second body from the second exterior surface, the pocket perimeter surfaces defining an outer mating profile that mates with the inner mating profile defined by the boss perimeter surfaces, the outer mating profile comprising, for each radial lobe of the inner mating profile, a notch that is configured to receive the radial lobe therein.

17. The method of claim 16, wherein inserting the boss into the pocket comprises contacting the first exterior surface with the second exterior surface.

18. The method of claim 16,
wherein the first body is in a first position when the boss is inserted into the pocket; and
wherein the method comprises:
removing the boss from the pocket to disengage the boss and pocket perimeter surfaces,
displacing the first body relative to the second body by one or both of translating and rotating the first body relative to the second body, and
re-inserting the boss into the pocket to place the first body in a second, different position.

19. The method of claim 16, comprising:
aligning the boss and pocket axes to be coincident;
wherein the discrete number of positions correspond to rotational positions of the boss about the coincident boss and pocket axes.

20. The method of claim 16,
wherein the first or second body comprises a seat configured to secure the work piece in a fixed position relative to the body; and
wherein the method comprises coupling the work piece to the seat in the fixed position.

* * * * *

UNITED STATES PATENT AND TRADEMARK OFFICE
CERTIFICATE OF CORRECTION

PATENT NO. : 12,269,134 B1  
APPLICATION NO. : 17/727267  
DATED : April 8, 2025  
INVENTOR(S) : Sharma et al.

Page 1 of 1

It is certified that error appears in the above-identified patent and that said Letters Patent is hereby corrected as shown below:

In the Specification

Column 3, Detailed Description, Line 54 Delete "108." and insert -- 106. -- therefor Column 8, Detailed Description, Line 66 Delete "204" and insert -- 206 -- therefor Column 9, Detailed Description, Line 14 Delete "202" and insert -- 200 -- therefor Column 12, Detailed Description, Line 8 After "portions;" insert -- and --

Column 12, Detailed Description, Line 9 Before "wherein" delete "and"

Signed and Sealed this
Tenth Day of June, 2025

Coke Morgan Stewart
*Acting Director of the United States Patent and Trademark Office*